(12) United States Patent
Fujishiro et al.

(10) Patent No.: US 9,832,698 B2
(45) Date of Patent: Nov. 28, 2017

(54) CELLULAR COMMUNICATION SYSTEM, USER TERMINAL, AND CELLULAR BASE STATION

(71) Applicant: KYOCERA CORPORATION, Kyoto (JP)

(72) Inventors: Masato Fujishiro, Yokohama (JP); Kugo Morita, Yokohama (JP); Yushi Nagasaka, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/761,882

(22) PCT Filed: Jan. 16, 2014

(86) PCT No.: PCT/JP2014/050710
§ 371 (c)(1),
(2) Date: Jul. 17, 2015

(87) PCT Pub. No.: WO2014/112563
PCT Pub. Date: Jul. 24, 2014

(65) Prior Publication Data
US 2015/0350990 A1    Dec. 3, 2015

Related U.S. Application Data

(60) Provisional application No. 61/754,106, filed on Jan. 18, 2013, provisional application No. 61/864,206, filed on Aug. 9, 2013.

(30) Foreign Application Priority Data

Nov. 25, 2013   (JP) ................................ 2013-242929

(51) Int. Cl.
*H04W 36/22* (2009.01)
*H04W 36/14* (2009.01)
(Continued)

(52) U.S. Cl.
CPC ........... *H04W 36/22* (2013.01); *H04W 4/027* (2013.01); *H04W 36/14* (2013.01); *H04W 48/18* (2013.01);
(Continued)

(58) Field of Classification Search
CPC ..... H04W 36/22; H04W 36/14; H04W 4/027; H04W 52/0206; H04W 48/18; H04W 84/12
See application file for complete search history.

(56) References Cited

U.S. PATENT DOCUMENTS 8,437,810 B2 * 5/2013 Hussain ............ H04W 52/0229
370/311
9,025,579 B2 * 5/2015 Kwon ................. H04W 76/026
370/338
(Continued)

FOREIGN PATENT DOCUMENTS

JP   2003-249937 A    9/2003
JP   2006-518975 A    8/2006
(Continued)

OTHER PUBLICATIONS

International Search Report, PCT/JP2014/050710, dated Apr. 1, 2014.
(Continued)

*Primary Examiner* — Min Jung
(74) *Attorney, Agent, or Firm* — Studebaker & Brackett PC

(57) ABSTRACT

A cellular communication system comprises: a UE configured to perform a WLAN-related process for switching an access network for accommodating a traffic of the UE to an E-UTRAN from a WLAN, on the basis of WLAN control information; and an eNB configured to manage a cell in which the UE exists. The UE transmits, to the eNB, a (Continued)

WLAN Interworking Indication indicating whether or not it is possible to perform the WLAN-related process, on the basis of at least one parameter related to the UE. The eNB having received the WLAN Interworking Indication determines whether or not to provide the UE with the WLAN control information, on the basis of the WLAN Interworking Indication.

3 Claims, 6 Drawing Sheets

(51) Int. Cl.
*H04W 4/02* (2009.01)
*H04W 48/18* (2009.01)
*H04W 52/02* (2009.01)
*H04W 84/12* (2009.01)

(52) U.S. Cl.
CPC ........ *H04W 52/0206* (2013.01); *H04W 84/12* (2013.01); *Y02B 60/50* (2013.01)

(56) References Cited

U.S. PATENT DOCUMENTS

| | | |
|---|---|---|
| 2004/0176024 A1 | 9/2004 | Hsu et al. |
| 2006/0098610 A1 | 5/2006 | Sundberg |
| 2007/0224988 A1 | 9/2007 | Shaheen |
| 2010/0016022 A1 | 1/2010 | Liu et al. |
| 2011/0222523 A1* | 9/2011 | Fu .................. H04W 36/22 370/338 |
| 2012/0315905 A1* | 12/2012 | Zhu ................ H04W 36/36 455/436 |
| 2013/0073710 A1 | 3/2013 | Lee |
| 2014/0334293 A1* | 11/2014 | Narasimha ........ H04W 28/08 370/229 |
| 2015/0257047 A1 | 9/2015 | Lu et al. |

FOREIGN PATENT DOCUMENTS

| | | |
|---|---|---|
| JP | 2008-092053 A | 4/2008 |
| JP | 2009-531972 A | 9/2009 |
| JP | 2012-514955 A | 6/2012 |
| WO | 2011/110108 A1 | 9/2011 |
| WO | 2012/064067 A2 | 5/2012 |
| WO | 2012/142436 A1 | 10/2012 |

OTHER PUBLICATIONS

Written Opinion of the International Searching Authority, PCT/JP2014/050710, dated Apr. 1, 2014.

3rd Generation Partenership Project; Technical Specification Group Radio Access Network; Study on WLAN/3GPP Radio Interworking (Release 12), 3GPP TR 37.834 v1.0.0 (Aug. 2013).

Extended European Search Report dated Jan. 4, 2017 from corresponding EP Appl No. 14741027.8, 11 pp.

Office Action issued by the Japanese Patent Office dated Feb. 7, 2017 in corresponding Japanese Patent Application No. 2014-557498 with concise explanation of relevance; 4pp.

\* cited by examiner

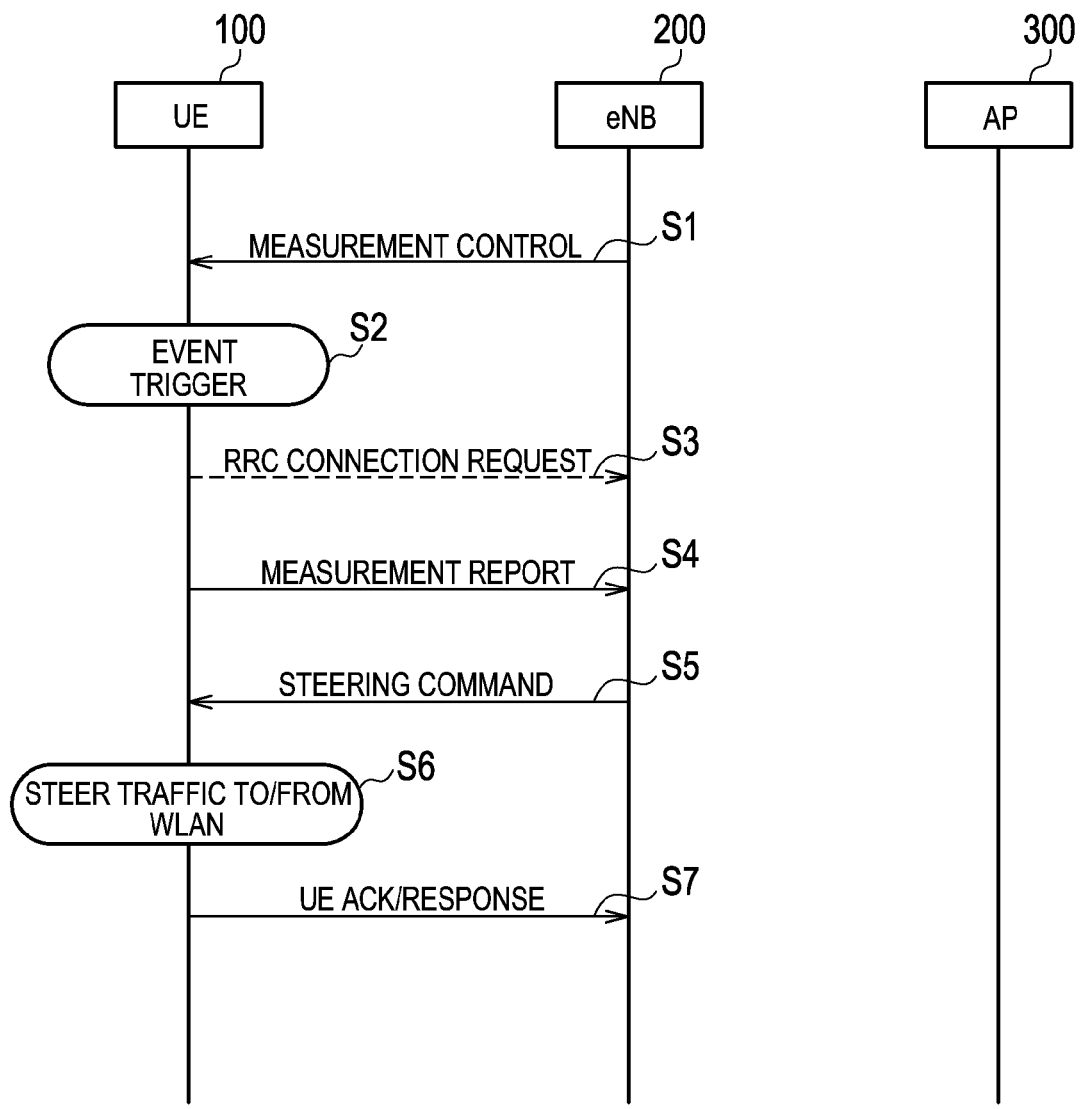

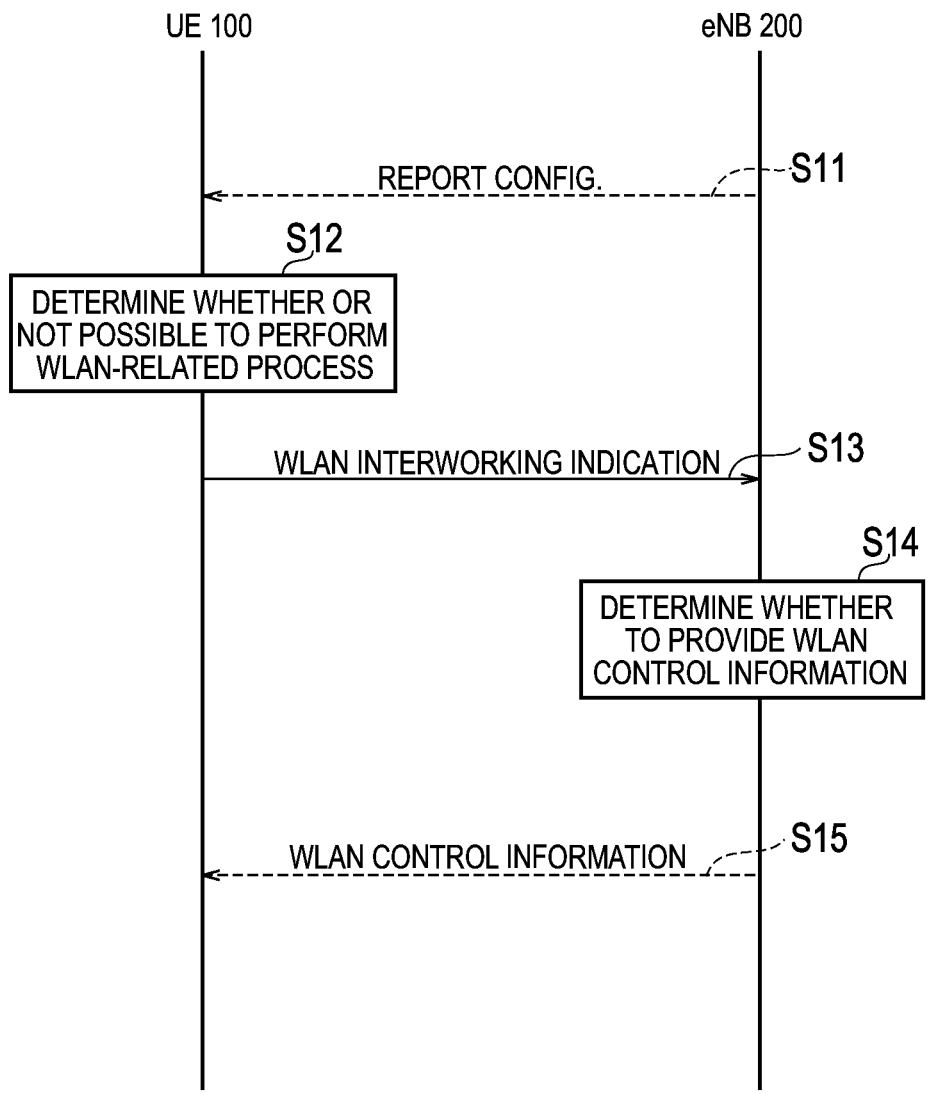

CELLULAR COMMUNICATION SYSTEM, USER TERMINAL, AND CELLULAR BASE STATION

TECHNICAL FIELD

The present invention relates to a cellular communication system capable of cooperating with a wireless LAN system, a user terminal, and a cellular base station.

BACKGROUND ART

In recent years, the use of a user terminal (what is termed as a dual terminal) having both functions of cellular communication and wireless LAN (Local Area Network) communication is increasingly becoming popular. Further, the number of wireless LAN access points managed by an operator of a cellular communication system increases.

Therefore, in 3GPP (3rd Generation Partnership Project) which is a project aiming to standardize a cellular communication system, a technology is being considered which is capable of strengthening cooperation between a cellular RAN (Radio Access Network) and a wireless LAN.

For example, when switching is made so that the traffic of a user terminal accommodated in a cellular RAN is accommodated in a wireless LAN, the traffic load of the cellular RAN can be reduced (off-load).

Further, as a network selection method of selecting, from the cellular RAN and the wireless LAN, an access network in which the traffic of a user terminal is accommodated, a plurality of network selection methods are proposed (see Non Patent Literature 1).

PRIOR ART DOCUMENT

Non-Patent Document

Non Patent Document 1: 3GPP technical report "TR 37.834 V1.0.0" August, 2013

SUMMARY OF THE INVENTION

In the above-described network selection methods, there is a method of executing a wireless LAN-related process where a user terminal switches an access network for accommodating a traffic of the user terminal to a wireless LAN, on the basis of wireless LAN control information provided from the cellular RAN.

In such a method, when the wireless LAN control information is provided to the user terminal without regard to each parameter related to the user terminal, there may be a case where the wireless LAN control information is provided to a user terminal not capable of executing the wireless LAN-related process, that is, an inappropriate user terminal.

On the other hand, a method may be possible where the cellular RAN is notified of every detailed parameter related to the user terminal; however, there is a problem in that an amount of radio resources to be consumed increases along with the notification of each parameter.

Therefore, an object of the present invention is to enable wireless LAN control information to be appropriately provided while restraining an amount of radio resources to be consumed.

A cellular communication system according to first aspect, comprises: a user terminal configured to perform a wireless LAN-related process for switching an access network for accommodating a traffic of the user terminal to a wireless LAN from a cellular RAN, on the basis of wireless LAN control information provided from the cellular RAN; and a cellular base station configured to manage a cell in which the user terminal exists, in the cellular RAN. The user terminal transmits, to the cellular base station, a notification indicating whether or not it is possible to perform the wireless LAN-related process, on the basis of at least one parameter related to the user terminal. The cellular base station having received the notification determines whether or not to provide the user terminal with the wireless LAN control information, on the basis of the received notification.

A user terminal according to second aspect performs a wireless LAN-related process for switching an access network for accommodating a traffic of the user terminal to a wireless LAN from a cellular RAN, on the basis of wireless LAN control information provided from the cellular RAN. The user terminal comprises: a transmission unit configured to transmit a notification indicating whether or not it is possible to perform the wireless LAN-related process, on the basis of at least one parameter related to the user terminal, to a cellular base station included in the cellular RAN.

A cellular base station according to third aspect manages a cell in which a user terminal exists, in a cellular communication system comprising the user terminal configured to perform a wireless LAN-related process for switching an access network for accommodating a traffic of the user terminal to a wireless LAN from a cellular RAN, on the basis of wireless LAN control information provided from the cellular RAN. The cellular base station comprises: a reception unit configured to receive a notification indicating whether or not it is possible to perform the wireless LAN-related process from the user terminal; and a control unit configured to determine, on the basis of the received notification, whether or not to provide the user terminal with the wireless LAN control information.

BRIEF DESCRIPTION OF THE DRAWINGS

FIG. 6 is a sequence diagram showing a third example of a network selection method.

FIG. 7 is a sequence diagram according to the embodiment.

DESCRIPTION OF THE EMBODIMENT

Overview of Embodiment

Figure 1:
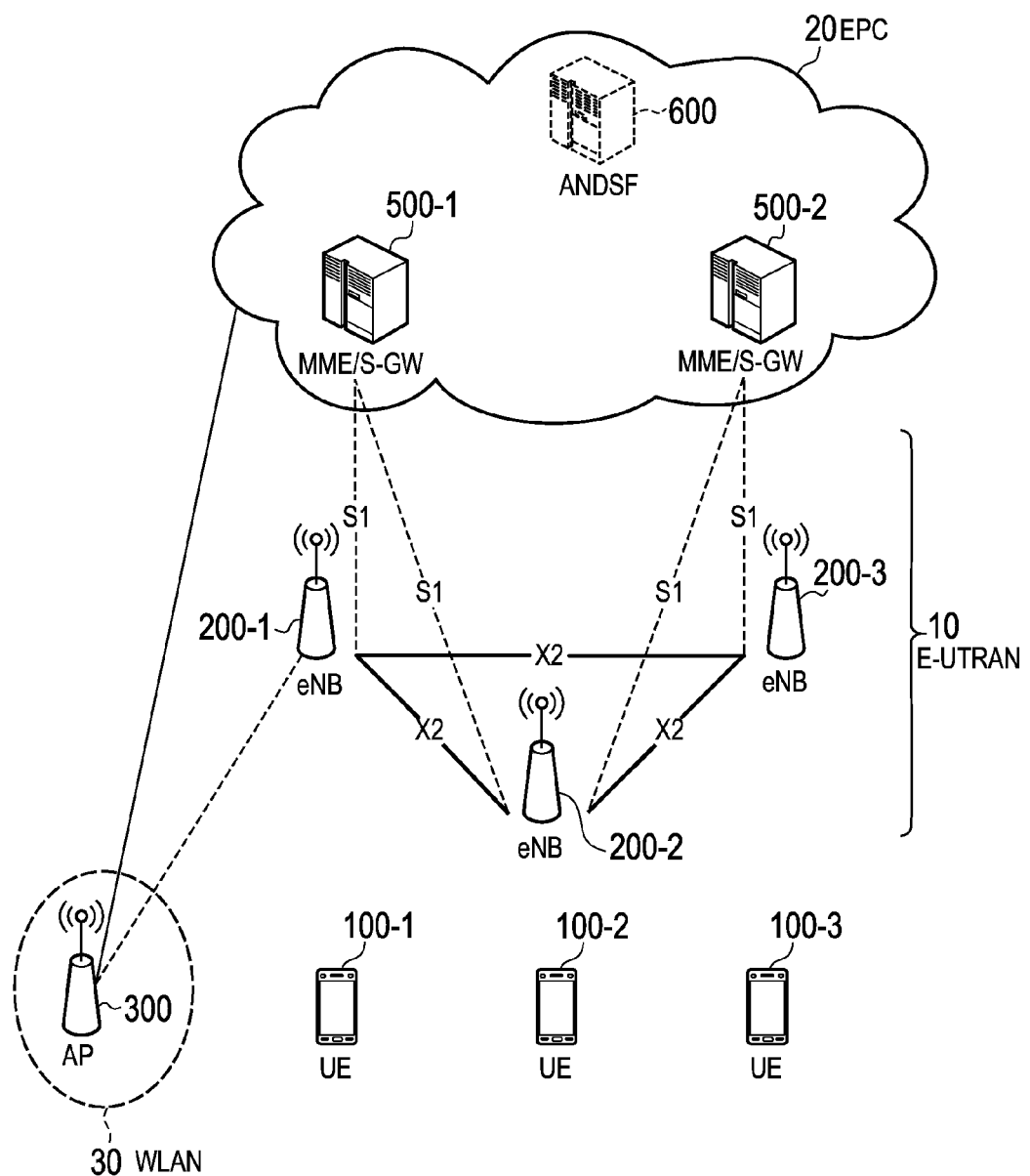
FIG. 1 is a system configuration diagram according to an embodiment.

A cellular communication system according to an embodiment, comprises: a user terminal configured to perform a wireless LAN-related process for switching an access network for accommodating a traffic of the user terminal to a wireless LAN from a cellular RAN, on the basis of wireless LAN control information provided from the cellular RAN; and a cellular base station configured to manage a cell in which the user terminal exists, in the cellular RAN. The user terminal transmits, to the cellular base station, a notification indicating whether or not it is possible to perform the wireless LAN-related process, on the basis of at least one parameter related to the user terminal. The cellular base station having received the notification determines whether or not to provide the user terminal with the wireless LAN control information, on the basis of the received notification.

In an embodiment according to an operation pattern 1, the parameter includes on/off of a wireless LAN communication unit of the user terminal. The user terminal transmits the notification indicating that it is possible to perform the wireless LAN-related process, in response to the wireless LAN communication unit being switched from off to on. The user terminal transmits the notification indicating that it is not possible to perform the wireless LAN-related process, in response to the wireless LAN communication unit being switched from on to off.

In an embodiment according to an operation pattern 2, the parameter includes a connected state to a predetermined wireless LAN access point. The user terminal transmits the notification indicating that it is possible to perform the wireless LAN-related process, in response to the user terminal disconnecting a connection with the predetermined wireless LAN access point. The user terminal transmits the notification indicating that it is not possible to perform the wireless LAN-related process, in response to the user terminal connecting with the predetermined wireless LAN access point.

In an embodiment according to an operation pattern 3, the parameter includes a detection state of a beacon signal transmitted by a wireless LAN access point. The user terminal transmits the notification indicating that it is possible to perform the wireless LAN-related process, in response to a state where the beacon signal is not detected being switched to a state where the beacon signal is detected. The user terminal transmits the notification indicating that it is not possible to perform the wireless LAN-related process, in response to the state where the beacon signal is detected being switched to the state where the beacon signal is not detected.

In an embodiment according to an operation pattern 4, the parameter includes a geological location of the user terminal. The user terminal transmits the notification indicating that it is possible to perform the wireless LAN-related process, in response to the geological location of the user terminal approaching a communication area of the wireless LAN access point. The user terminal transmits the notification indicating that it is not possible to perform the wireless LAN-related process, in response to the geological location of the user terminal leaving the communication area of the wireless LAN access point.

In the embodiment according to the operation pattern 4, the user terminal controls whether or not to measure a geological location of the user terminal, on the basis of at least one of: whether or not the user terminal is communicating with the cellular RAN; and a type of an application to be used for the communication.

In an embodiment according to an operation pattern 5, the parameter includes a moving speed of the user terminal. The user terminal transmits the notification indicating that it is possible to perform the wireless LAN-related process, in response to the moving speed of the user terminal falling below a threshold value. The user terminal transmits the notification indicating that it is not possible to perform the wireless LAN-related process, in response to the moving speed of the user terminal exceeding a threshold value.

In an embodiment according to an operation pattern 6, the parameter includes a battery remaining amount of the user terminal. The user terminal transmits the notification indicating that it is possible to perform the wireless LAN-related process, in response to the battery remaining amount of the user terminal exceeding a threshold value. The user terminal transmits the notification indicating that it is not possible to perform the wireless LAN-related process, in response to the battery remaining amount of the user terminal falling below a threshold value.

In an embodiment, the wireless LAN control information is at least one of: a network selection rule; a network selection parameter applied to the network selection rule; wireless LAN measurement control information; and a command for traffic switching to a wireless LAN.

In an embodiment, the notification includes at least one of: an identifier of a wireless LAN access point to which the user terminal can be connected; a measurement result for the wireless LAN access point; load information of the wireless LAN access point; and information indicating wireless LAN control information with which the user terminal desirably is provided.

In an embodiment, the cellular base station having received the notification indicating that it is possible to perform the wireless LAN-related process provides the user terminal with the wireless LAN control information, on the basis of the received notification.

In an embodiment, the cellular base station transmits, to the user terminal, setting information indicating whether to enable or disable transmission of the notification. The user terminal enables the transmission of the notification when receiving the setting information indicating that the transmission of the notification is enabled. The user terminal disables the transmission of the notification when receiving the setting information indicating that the transmission of the notification is disabled.

A user terminal according to an embodiment performs a wireless LAN-related process for switching an access network for accommodating a traffic of the user terminal to a wireless LAN from a cellular RAN, on the basis of wireless LAN control information provided from the cellular RAN. The user terminal comprises: a transmission unit configured to transmit a notification indicating whether or not it is possible to perform the wireless LAN-related process, on the basis of at least one parameter related to the user terminal, to a cellular base station included in the cellular RAN.

A cellular base station according to an embodiment manages a cell in which a user terminal exists, in a cellular communication system comprising the user terminal configured to perform a wireless LAN-related process for switching an access network for accommodating a traffic of the user terminal to a wireless LAN from a cellular RAN, on the basis of wireless LAN control information provided from the cellular RAN. The cellular base station comprises: a reception unit configured to receive a notification indicating whether or not it is possible to perform the wireless LAN-related process from the user terminal; and a control unit configured to determine, on the basis of the received notification, whether or not to provide the user terminal with the wireless LAN control information.

Embodiment

Below, with reference to the drawing, an embodiment in which a cellular communication system (an LTE system) configured in compliance with the 3GPP standards is linked with a wireless LAN (WLAN) system will be described.

(System Configuration)

FIG. 1 is a system configuration diagram according to the embodiment. As shown in FIG. 1, the cellular communication system includes a plurality of UEs (User Equipments) 100, an E-UTRAN (Evolved-UMTS Terrestrial Radio Access Network) 10, and an EPC (Evolved Packet Core) 20.

The E-UTRAN 10 corresponds to a cellular RAN. The EPC 20 corresponds to a core network. The E-UTRAN 10 and the EPC 20 configure a network of the cellular communication system.

The UE 100 is a mobile radio communication device and performs radio communication with a cell with which a connection is established. The UE 100 corresponds to the user terminal. The UE 100 is a terminal (dual terminal) that supports both cellular communication scheme and WLAN communication scheme.

The E-UTRAN 10 includes a plurality of eNBs 200 (evolved Node-Bs). The eNB 200 corresponds to a cellular base station. The eNB 200 manages one or a plurality of cells and performs radio communication with the UE 100 which establishes a connection with the cell of the eNB 200. It is noted that the "cell" is used as a term indicating a minimum unit of a radio communication area, and is also used as a term indicating a function of performing radio communication with the UE 100. Further, the eNB 200 has a radio resource management (RRM) function, a routing function of user data, and a measurement control function for mobility control and scheduling, for example.

The eNBs 200 are connected mutually via an X2 interface. Further, the eNB 200 is connected to MME (Mobility Management Entity)/S-GW (Serving-Gateway) 500 included in the EPC 20 via an S1 interface.

The EPC 20 includes a plurality of MMEs/S-GWs 500. The MME is a network node for performing various mobility controls, for example, for the UE 100, and corresponds to a controller. The S-GW is a network node that performs transfer control of user data and corresponds to a mobile switching center.

WLAN 30 includes a WLAN access point (hereinafter, briefly referred to as "AP") 300. The AP 300 is an AP (Operator controlled AP) managed by an operator of a cellular communication system, for example.

The WLAN 30 is configured to comply with standards of IEEE 802.11, for example. The AP 300 communicates with the UE 100 in a frequency band (WLAN frequency band) different from a cellular frequency band. The AP 300 is connected via a router, etc., to the EPC 20.

Further, it is not limited to the case where the eNB 200 and the AP 300 are separately disposed. The eNB 200 and the AP 300 may be arranged in the same place (Collocated). As one mode of the Collocated, the eNB 200 and the AP 300 may be directly connected to each other through any interface of an operator.

The EPC 20 may further include an ANDSF (Access Network Discovery and Selection Function) server 600. The ANDSF server 600 manages ANDSF information on the WLAN 30. The ANDSF server 600 provides the UE 100 with the ANDSF information on the WLAN 30, by an NAS (Non Access Stratum) message.

Subsequently, a configuration of the UE 100 and the eNB 200 will be described.

Figure 2:
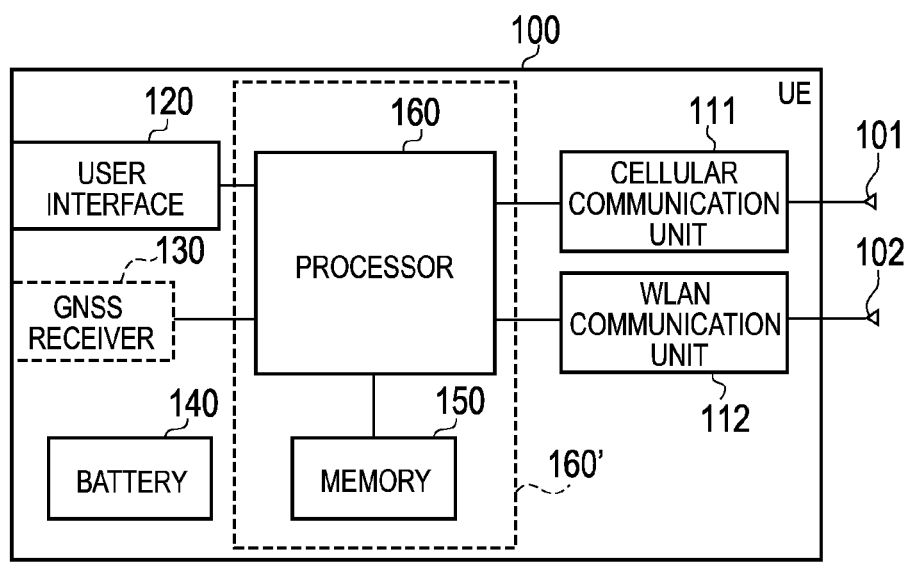
FIG. 2 is a block diagram of a UE according to the embodiment.

FIG. 2 is a block diagram of the UE 100. As shown in FIG. 2, the UE 100 includes: antennas 101 and 102; a cellular communication unit 111; a WLAN communication unit 112; a user interface 120; a GNSS (Global Navigation Satellite System) receiver 130; a battery 140; a memory 150; and a processor 160. The memory 150 and the processor 160 configure a control unit. The UE 100 may not have the GNSS receiver 130. It is noted that the memory 150 may be integrally formed with the processor 160, and this set (that is, a chipset) may be called a processor 160'.

The antenna 101 and the cellular communication unit 111 are used for transmitting and receiving a cellular radio signal. The cellular communication unit 111 converts a baseband signal output from the processor 160 into the cellular radio signal, and transmits the same from the antenna 101. Further, the cellular communication unit 111 converts the cellular radio signal received by the antenna 101 into the baseband signal, and outputs the same to the processor 160.

The antenna 102 and the WLAN communication unit 112 are used for transmitting and receiving a WLAN radio signal. The WLAN communication unit 112 converts the baseband signal output from the processor 160 into a WLAN radio signal, and transmits the same from the antenna 102. Further, the WLAN communication unit 112 converts the WLAN radio signal received by the antenna 102 into a baseband signal, and outputs the same to the processor 160.

The user interface 120 is an interface with a user carrying the UE 100, and includes, for example, a display, a microphone, a speaker, and various buttons. Upon receipt of the input from a user, the user interface 120 outputs a signal indicating a content of the input to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes the baseband processor that performs modulation and demodulation, and encoding and decoding on the baseband signal and a CPU that performs various processes by executing the program stored in the memory 150. The processor 160 may further include a codec that performs encoding and decoding on sound and video signals. The processor 160 executes various processes and various communication protocols described later.

Figure 3:
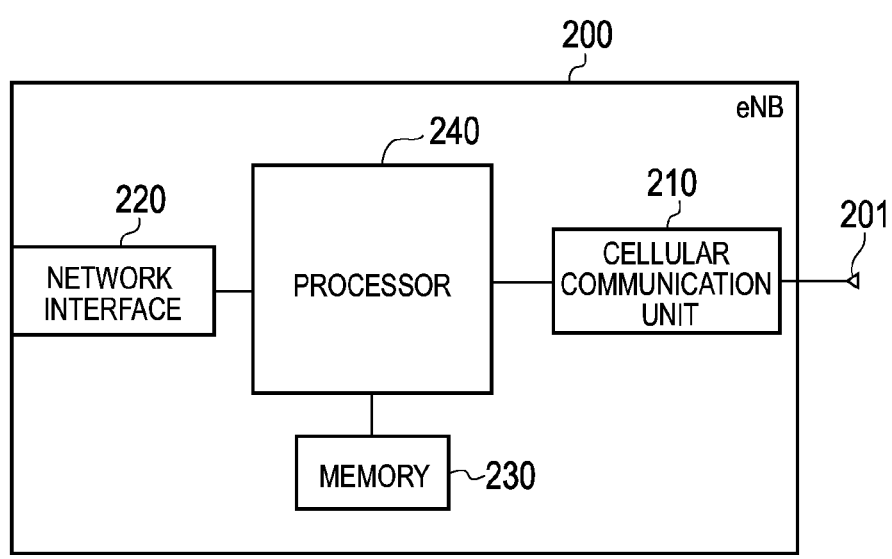
FIG. 3 is a block diagram of an eNB according to the embodiment.

FIG. 3 is a block diagram of the eNB 200. As shown in FIG. 3, the eNB 200 includes an antenna 201, a cellular communication unit 210, a network interface 220, a memory 230, and a processor 240. The memory 230 and the processor 240 configure a control unit. It is noted that the memory 230 may be integrally formed with the processor 240, and this set (that is, a chipset) may be called a processor.

The antenna 201 and the cellular communication unit 210 are used for transmitting and receiving a cellular radio signal. The cellular communication unit 210 converts the baseband signal output from the processor 240 into the cellular radio signal, and transmits the same from the antenna 201. Furthermore, the cellular communication unit 210 converts the cellular radio signal received by the antenna 201 into the baseband signal, and outputs the same to the processor 240.

The network interface 220 is connected to the neighboring eNB 200 via an X2 interface and is connected to the MME/S-GW 500 via the S1 interface. Further, the network interface 220 is used for communication with the AP 300 via the EPC 20.

The memory 230 stores a program to be executed by the processor 240 and information to be used for a process by the processor 240. The processor 240 includes the baseband processor that performs modulation and demodulation, encoding and decoding and the like on the baseband signal and a CPU that performs various processes by executing the program stored in the memory 230. The processor 240 implements various processes and various communication protocols described later. Further, the memory 230 may be integrally formed with the processor 240, and this set (that is, a chipset) may be called a processor 240'.

Figure 4:
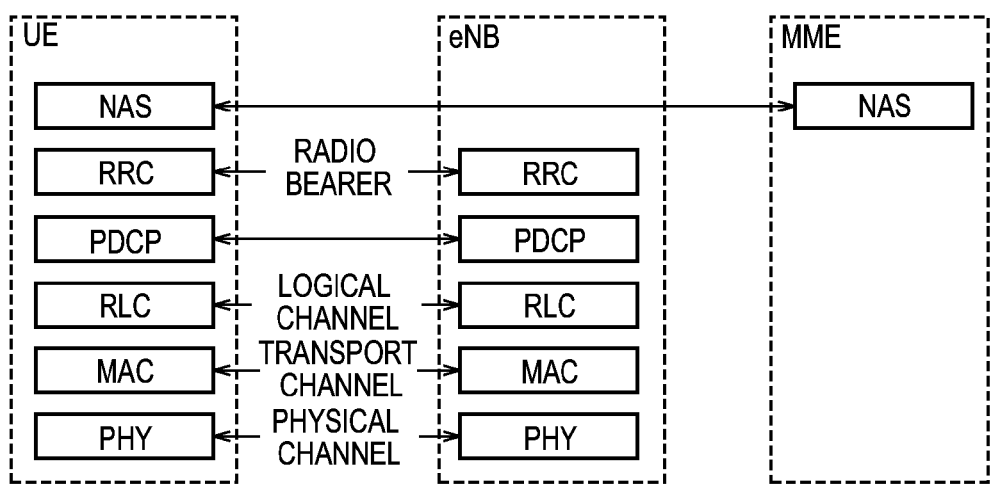
FIG. 4 is a protocol stack diagram of a radio interface in an LTE system.

FIG. 4 is a protocol stack diagram of a radio interface in the LTE system. As shown in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, user data and a control signal are transmitted via the physical channel.

The MAC layer performs priority control of data, and a retransmission process and the like by hybrid ARQ (HARQ). Between the MAC layer of the UE 100 and the MAC layer of the eNB 200, user data and a control signal are transmitted via a transport channel. The MAC layer of the eNB 200 includes a scheduler for determining a transport format (a transport block size, a modulation and coding scheme and the like) of an uplink and a downlink, and an allocated resource block to the UE 100.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane handling a control signal. Between the RRC layer of the UE 100 and the RRC layer of the eNB 200, the control signal (an RRC message) for various types of setting is transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in an RRC connected state, otherwise, the UE 100 is in an RRC idle state.

A NAS (Non-Access Stratum) layer positioned above the RRC layer performs session management or mobility management, for example. MME 300 and the ANDSF server 600 transmit and receive a NAS message to/from the UE 100

(Access Network Selection)

Figure 5:
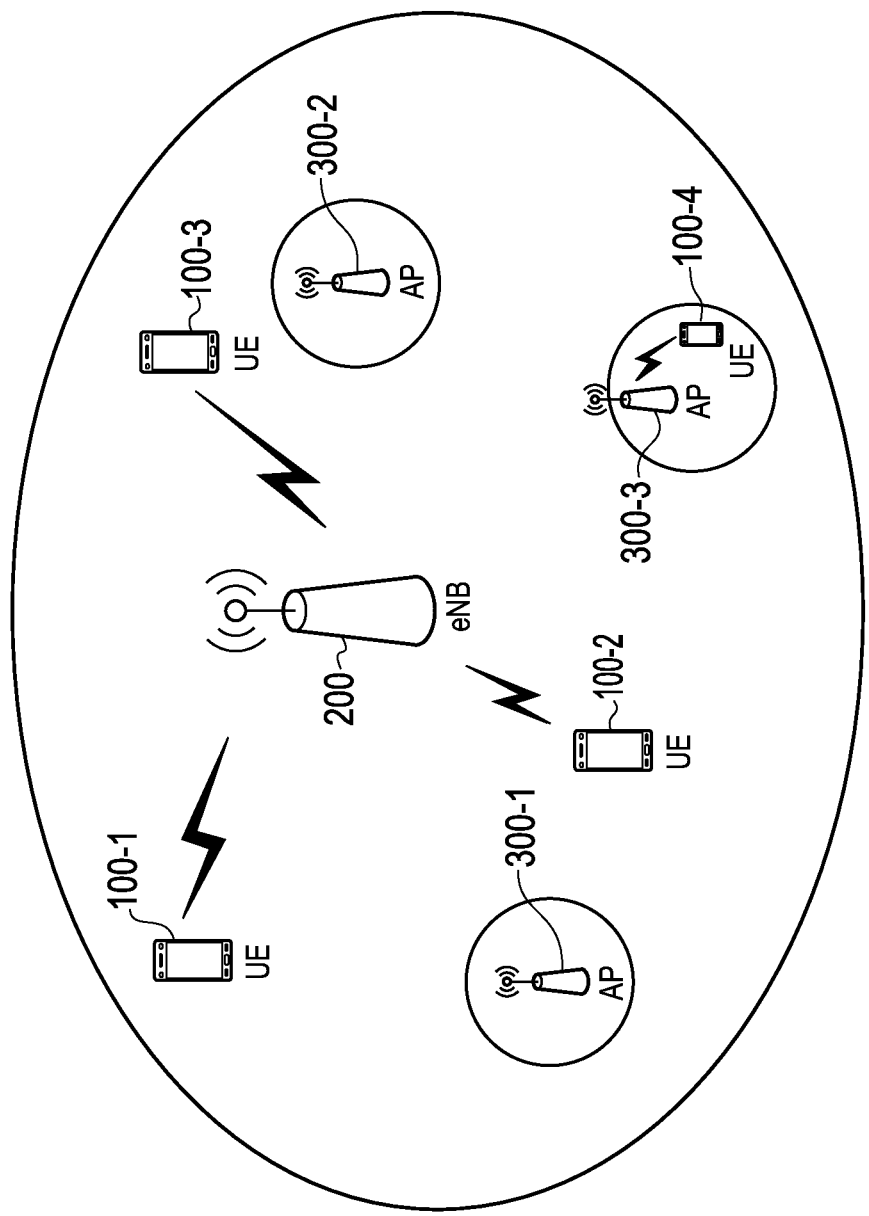
FIG. 5 is a diagram for illustrating an operation environment according to the embodiment.

FIG. 5 is a diagram for illustrating an operation environment according to the embodiment. As shown in FIG. 5, a plurality of APs 300 are arranged in the cell of the eNB 200. Further, the plurality of UEs 100 exist on the cell of the eNB 200. The UE 100 establishes a connection with the eNB 200, and may perform cellular communication with the eNB 200. In this case, the UE 100 transmits and receives a cellular radio signal including a traffic (user data) to/from the eNB 200.

In such an operation environment, when a traffic steering is used where switching is made so that the traffic of the UE 100 accommodated in the eNB 200 (E-UTRAN 10) is accommodated in the AP 300 (WLAN 30), a traffic load in the eNB 200 can be reduced (off-load). The traffic steering includes a case where a connection destination of the UE 100 is switched between the eNB 200 and the AP 300 and a case where at least a part of a data path is switched between the eNB 200 and the AP 300 while the UE 100 is connected with both the eNB 200 and the AP 300.

In the embodiment, to select, from the E-UTRAN 10 and the WLAN 30, an access network (accommodation network) where the traffic of the UE 100 is accommodated, a network selection method where the E-UTRAN 10 is involved is assumed.

A first example of the network selection method is a method where a selection rule for an accommodation network (hereinafter, referred to as "network selection rule") is provided only from the ANDSF server 600 and the authority to decide an accommodation network is held by the UE 100. The E-UTRAN 10 provides the UE 100 with assistance information (a network selection parameter). An example of a relationship between the network selection rule and the network selection parameter is: "cellular measurement value <A & WLAN measurement value >B", where a rule in which the traffic steering is performed from the E-UTRAN 10 to the WLAN 30 corresponds to the network selection rule, and "A" and "B" correspond to the network selection parameter.

A second example of the network selection method is a method where the network selection parameter can be provided from the E-UTRAN 10 and the authority to decide an accommodation network is held by the UE 100 in accordance with the network selection rule. It is noted that the network selection rule can be provided also from the ANDSF server 600.

A third example of the network selection method is a method where the authority to decide an accommodation network is held by the E-UTRAN 10. In the third example, the E-UTRAN 10 decides an accommodation network in much the same procedure as in a handover procedure of the LTE system.

FIG. 6 is a sequence diagram showing the third example of the network selection method. In an initial state of the present sequence, the UE 100 is in a state of establishing an RRC connection with the eNB 200 (connected state).

As shown in FIG. 6, in step S1, the eNB 200 transmits, to the UE 100 subject to off-load, a WLAN measurement command to control a WLAN measurement. The WLAN measurement command includes an identifier of the AP 300 (WLAN identifier) on which the UE 100 performs measurement. Further, the WLAN measurement command includes trigger information indicating a trigger by which the WLAN measurement report for reporting a result of the WLAN measurement is transmitted to the eNB 200.

The UE 100 having received the WLAN measurement command performs the WLAN measurement in accordance with the WLAN measurement command. For example, the UE 100 measures a received power, etc., of a beacon signal from the AP 300, on the WLAN identifier included in the WLAN measurement command.

In step S2, the UE 100 detects an event as a transmission trigger for a WLAN measurement report, on the basis of the trigger information included in the WLAN measurement command. Here, when the UE 100 is transitioned to an idle state, the UE 100 establishes again an RRC connection with the eNB 200 in order to transmit the WLAN measurement report to the eNB 200 (step S3).

In step S4, the UE 100 transmits the WLAN measurement report to report a result of the WLAN measurement, to the eNB 200. The WLAN measurement report includes a WLAN identifier and a WLAN measurement result (the received power of the beacon signal, etc.), for example.

In step S5, the eNB 200 having received the WLAN measurement report transmits, to the UE 100, a Steering command (off-load command) to command performance of off-load, on the basis of the WLAN measurement report, the RAN, etc. It is noted that the Steering command may be a command to instruct a traffic transition (off-load cancellation) from the WLAN to the eNB 200, in addition to a command to instruct a traffic transition (off-load) from the eNB 200 to the WLAN.

In step S6, the UE 100 having received the off-load command performs the off-load. That is, the UE 100 switches so that the traffic to be transmitted and received to/from the eNB 200 is transmitted and received to/from the AP 300. It is noted that if the connection with the AP 300 is not established when the UE 100 has received the off-load command, the UE 100 establishes the connection with the AP 300 prior to the off-load.

In step S7, the UE 100 transmits, to the eNB 200, a response to the off-load command.

Thus, the UE 100 performs a WLAN-related process for switching the accommodation network to the WLAN 300, on the basis of WLAN control information provided from the E-UTRAN 10.

In the first example of the network selection method, the WLAN control information provided from the E-UTRAN 10 is the network selection parameter. In the second example of the network selection method, the WLAN control information provided from the E-UTRAN 10 is the network selection rule. Further, in the first example and the second example of the network selection method, the WLAN-related process is a process of performing a network selection on the basis of the network selection rule and the network selection parameter.

In the third example of the network selection method, the WLAN control information is WLAN measurement control information (WLAN measurement command) and a command for traffic switching (Steering command) to the WLAN. Further, the WLAN-related process is a process of performing the WLAN measurement and a process of executing the off-load.

(Operation According to Embodiment)

Hereinafter, an operation according to the embodiment will be described.

(1) Operation Overview

As described above, the UE 100 performs the WLAN-related process for switching the accommodation network to the WLAN 300, on the basis of the WLAN control information provided from the E-UTRAN 10. However, when the WLAN control information is provided to the UE 100 without regard to a status of the UE 100 (that is, each parameter related to the UE 100), the WLAN control information may be provided to an inappropriate UE 100. The inappropriate UE 100 includes a UE 100 with a WLAN communication function (WLAN communication unit 112) turned off, or a UE 100 around which an AP 300 exists, for example. On the other hand, a method may be possible where the E-UTRAN 10 is notified of every detailed status of the UE 100; however, an amount of radio resources to be consumed increases along with the notification.

Therefore, in the embodiment, the UE 100 transmits, to the eNB 200, a notification indicating whether or not it is possible to perform the WLAN-related process (hereinafter, referred to as "WLAN Interworking Indication"), on the basis of at least one parameter related to the UE 100 (hereinafter, referred to as "UE-related parameter"). The UE-related parameter will be described in detail later.

The eNB 200 having received the WLAN Interworking Indication determines whether or not to provide the UE 100 with the WLAN control information, on the basis of the received WLAN Interworking Indication. For example, the eNB 200 provides the UE 100 with the WLAN control information, only when receiving, from the UE 100, the WLAN Interworking Indication indicating that it is possible to perform the WLAN-related process.

Thus, when the UE 100 indicates to the eNB 200 whether or not it is possible to perform the WLAN-related process on the basis of the status of the UE 100, it is possible to restrain an amount of radio resources to be consumed as compared to a method where the E-UTRAN 10 is notified of every detailed status of the UE 100 and it is possible to prevent the inappropriate UE 100 from being provided with the WLAN control information.

(2) Operation Sequence

FIG. 7 is a sequence diagram according to the embodiment. In FIG. 7, it is assumed that the UE 100 exists in a cell of the eNB 200. It is noted that in FIG. 7, signaling indicated by a dashed line is not an essential signaling.

As shown in FIG. 7, in step S11, the eNB 200 transmits, to the UE 100, setting information (hereinafter, referred to as "Report Config") indicating whether the transmission of the WLAN Interworking Indication is enabled (Enable) or disabled (Disable). The eNB 200 transmits the Report Config by broadcast to within the cell of the eNB 200. Alternatively, the eNB 200 may receive, from the UE 100, the information indicating whether the UE 100 has the WLAN communication function, and transmit the Report Config by unicast to the UE 100 having the WLAN communication function. The UE 100 enables the transmission of the WLAN Interworking Indication when receiving the Report Config (Enable). On the other hand, the UE 100 disables the transmission of the WLAN Interworking Indication when receiving the Report Config (Disable). Here, description proceeds with an assumption that the Report Config (Enable) is received.

In step S12, the UE 100 determines whether or not it is possible to perform the WLAN-related process, on the basis of the UE-related parameter. Such a determination differs in technique depending on each type of the UE-related parameter. The details of step S12 will be described later.

In step S13, the UE 100 transmits, to the eNB 200, the WLAN Interworking Indication indicating whether it is possible to perform the WLAN-related process (OK) or not possible to perform the same process (NG). The WLAN Interworking Indication may include at least one field of: an identifier (for example, SSID: Service Set Identifier) of the AP 300 to which the UE 100 can be connected; a measurement result (for example, RSSI: Received Signal Strength Indicator) for the AP 300; load information of the AP 300; and information indicating the WLAN control information with which the UE 100 desirably is provided, in addition to a Type field indicating whether it is possible to perform (OK)/not possible to perform (NG). Each field may be a list form. It is noted that the AP 300 to which the UE 100 can connect is the AP 300 to which the UE 100 has an authority to connect. The information indicating the WLAN control information with which the UE 100 desirably is provided is a name of an item of the WLAN control information with which the UE 100 desirably is provided or an index of the name of the item. For example, it is possible to set a name of an item (or an index) corresponding to a deficiency of ANDSF information.

In step S14, the eNB 200 having received the WLAN Interworking Indication determines whether or not to provide the UE 100 with the WLAN control information, on the basis of the received WLAN Interworking Indication. For example, the eNB 200 determines to provide the UE 100 with the WLAN control information, only when receiving, from the UE 100, the WLAN Interworking Indication indicating that it is possible to perform the WLAN-related process (OK). Here, the following description will be given on the assumption that it is determined that the WLAN control information is provided to the UE 100.

In step S15, the eNB 200 transmits the WLAN control information to the UE 100. Here, when the information indicating the WLAN control information with which the UE 100 desirably is provided is included in the WLAN Interworking Indication, the eNB 200 may provide the UE 100 only with the WLAN control information with which the UE 100 desirably is provided. The UE 100 having received the WLAN control information performs the WLAN-related process on the basis of the received WLAN control information.

(3) Operation of UE 100

Next, an operation pattern of the UE 100 in step S12 in FIG. 7 will be described. Of each operation pattern that follows, only any one of these patterns may be implemented and two or more thereof may be combined and implemented.

In an operation pattern 1, the UE-related parameter is on/off of the WLAN communication unit 112 (WLAN communication function) of the UE 100. The UE 100 transmits the WLAN Interworking Indication indicating that it is possible to perform the WLAN-related process (OK), in response to the WLAN communication unit 112 being switched from off to on. The UE 100 transmits the WLAN Interworking Indication indicating that it is not possible to perform the WLAN-related process (NG), in response to the WLAN communication unit 112 being switched from on to off.

In an operation pattern 2, the UE-related parameter is a connected state to a predetermined AP 300. The predetermined AP 300 is a Home AP or an AP in which a connection setting is manually performed by a user. The UE 100 transmits the WLAN Interworking Indication indicating that it is possible to perform the WLAN-related process (OK), in response to the UE 100 disconnecting the connection with a predetermined AP 300. The UE 100 transmits the WLAN Interworking Indication indicating that it is not possible to perform the WLAN-related process (NG), in response to the UE 100 connecting to a predetermined AP 300.

In an operation pattern 3, the UE-related parameter is a detection state of a beacon signal transmitted by the AP 300. The UE 100 transmits the WLAN Interworking Indication indicating that it is possible to perform the WLAN-related process (OK), in response to a state where the beacon signal is detected being switched from a state where the beacon signal is not detected. The UE 100 transmits the WLAN Interworking Indication indicating that it is not possible to perform the WLAN-related process (NG), in response to a state where the beacon signal is not detected being switched from a state where the beacon signal is detected.

In an operation pattern 4, the UE-related parameter is a geological location of the UE 100. The geological location of the UE 100 is measured by using the GNSS receiver 130, for example. The UE 100 transmits the WLAN Interworking Indication indicating that it is possible to perform the WLAN-related process (OK), in response to the geological location of the UE 100 approaching a communication area of the AP 300. The UE 100 transmits the WLAN Interworking Indication indicating that it is not possible to perform the WLAN-related process (NG), in response to the geological location of the UE 100 leaving the communication area of the AP 300. It is noted that in the operation pattern 4, it is assumed that the UE 100 holds a list (white list) of the APs 300 to which the UE 100 has an authority to connect. For example, the white list includes an identifier of the AP 300 to which the UE 100 has an authority to connect and location information corresponding to the communication area of the AP 300.

It is noted that in the operation pattern 4, when the UE 100 always measures the geological location of the UE 100, the power consumed by the GNSS receiver 130 increases. Therefore, the UE 100 may determine whether to measure the geological location of the UE 100 on the basis of at least one of: whether or not the UE 100 is communicating with the E-UTRAN 10; a type of an application to be used for the communication; and whether or not the Report Config (Enable) is received.

In an operation pattern 5, the UE-related parameter is a moving speed of the UE 100. The moving speed of the UE 100 can be estimated on the basis of a change in geological location of the UE 100, or an acceleration measured by using an acceleration sensor, for example. The UE 100 transmits the WLAN Interworking Indication indicating that it is possible to perform the WLAN-related process (OK), in response to the moving speed of the UE 100 falling below a threshold value (that is, moving at a low speed). The UE 100 transmits the WLAN Interworking Indication indicating that it is not possible to perform the WLAN-related process (NG), in response to the moving speed of the UE 100 exceeding a threshold value (that is, moving at a high speed).

It is noted that in the operation pattern 5, when the UE 100 always measures the moving speed of the UE 100, the power consumed by the GNSS receiver 130 (or the acceleration sensor) increases. Therefore, the UE 100 may determine whether to measure the moving speed of the UE 100 on the basis of at least one of: whether or not the UE 100 is communicating with the EUTRAN 10; a type of an application to be used for the communication; and whether or not the Report Config (Enable) is received.

In an operation pattern 6, the UE-related parameter is a battery remaining amount of the UE 100. The UE 100 transmits the WLAN Interworking Indication indicating that it is possible to perform the WLAN-related process (OK), in response to the battery remaining amount of the UE 100 exceeding a threshold value. The UE 100 transmits the WLAN Interworking Indication indicating that it is not possible to perform the WLAN-related process (NG), in response to the battery remaining amount of the UE 100 falling below a threshold value.

In an operation pattern 7, the UE-related parameter is whether or not the UE 100 is connected to a power source (AC power source). The UE 100 transmits the WLAN Interworking Indication indicating that it is possible to perform the WLAN-related process (OK), in response to the UE 100 being connected to the power source.

In an operation pattern 8, the UE-related parameter is whether or not the UE 100 is set to a power saving mode. The UE 100 transmits the WLAN Interworking Indication indicating that it is possible to perform the WLAN-related process (OK), in response to the power saving mode being canceled. The UE 100 transmits the WLAN Interworking Indication indicating that it is not possible to perform the WLAN-related process (NG), in response to the power saving mode being set.

Conclusion of Embodiment

As described above, the UE 100 transmits the WLAN Interworking Indication to the eNB 200, on the basis of the UE-related parameter. The eNB 200 having received the WLAN Interworking Indication determines whether or not to provide the UE 100 with the WLAN control information, on the basis of the received WLAN Interworking Indication. Thus, when the UE 100 indicates to the eNB 200 whether or not it is possible to perform the WLAN-related process on the basis of the status of the UE 100, it is possible to restrain an amount of radio resources to be consumed as compared to a method where the E-UTRAN 10 is notified of every detailed status of the UE 100 and it is possible to prevent the inappropriate UE 100 from being provided with the WLAN control information.

Other Embodiments

The aforementioned embodiment has described an example in which the present invention is applied to the LTE system. However, the present invention may also be applied to systems, other than the LTE system, as well as the LTE system. Further, in the aforementioned operation sequence, another RAN node (such as an RNC) may perform the operation which the eNB 200 (the base station) performs, instead of the base station.

In addition, the entire content of U.S. Provisional Application No. 61/754,106 (filed on Jan. 18, 2013), U.S. Provisional Application No. 61/864,206 (filed on Aug. 9, 2013), and Japanese Patent Application No. 2013-242929 (filed on Nov. 25, 2013) is incorporated in the present specification by reference.

INDUSTRIAL APPLICABILITY

The present invention is useful in a mobile communication field.

The invention claimed is:

1. A communication control method, comprising:
determining, by an user terminal, whether or not a Wireless Local Area Network (WLAN) connection is turned off;
transmitting information from the user terminal to a base station, the base station being configured to connect with the user terminal and to perform a communication by Long Term Evolution (LTE) technology, in response to determining that the WLAN connection is turned off, wherein the information indicates that the user terminal cannot connect to an access point configured to perform a communication by the WLAN;
detecting, by the user terminal, whether or not the user terminal is in a connected state to a predetermined access point configured to perform the communication by the WLAN; and
transmitting the information from the user terminal to the base station, in response to determining that the user terminal is the connected state to the predetermined access point.

2. A user terminal, comprising:
a processor, and
a memory communicatively coupled to the processor, wherein
the processor is configured to perform a process to connect to a base station, the base station being configured to perform a communication by Long Term Evolution (LTE) technology or to an access point configured to perform a communication by Wireless Local Area Network (WLAN),
the processor is further configured to:
determine whether or not a WLAN connection is turned off;
transmit information to the base station in response to determining that the WLAN connection is turned off, wherein the information indicates that the user terminal cannot connect to the access point,
detect whether or not the user terminal is in a connected state to a predetermined access point configured to perform the communication by the WLAN; and
transmit the information from the user terminal to the base station in response to determining that the user terminal is the connected state to the predetermined access point.

3. A base station, comprising:
a processor; and
a memory communicatively coupled to the processor, wherein
the processor is configured to:
perform a communication by Long Term Evolution (LTE) technology with a user terminal, the user terminal being configured to perform a process to connect to the base station or to an access point configured to perform a communication by Wireless Local Area Network (WLAN); and
receive first information from the user terminal having determined that a WLAN connection is turned off, wherein
the first information is transmitted by the user terminal to the base station in response to determining that a WLAN connection is turned off, and the first information indicates that the user terminal cannot connect to the access point,
the processor is further configured to receive second information from the user terminal having detected that the user terminal is in a connected state to a predetermined access point configured to perform the communication by the WLAN, wherein
the second information is transmitted by the user terminal to the base station in response to detecting that the user terminal is in the connected state to the predetermined access point, and the second information indicates that the user terminal cannot connect to the access point.

* * * * *